Feb. 6, 1940.　　　　　G. A. LYON　　　　　2,189,744

WHEEL COVER DISK

Filed Aug. 2, 1937

Inventor
GEORGE ALBERT LYON.

by Charles Hill Attys

Patented Feb. 6, 1940

2,189,744

UNITED STATES PATENT OFFICE 2,189,744

WHEEL COVER DISK

George Albert Lyon, Allenhurst, N. J.

Application August 2, 1937, Serial No. 156,874

4 Claims. (Cl. 301—37)

This invention relates to improvements in a wheel cover disk, and more particularly to a wheel cover disk of the type adapted for disposition over the outer side surface of a vehicle wheel, such, for example, as an automobile wheel.

It is an object of the present invention to provide a wheel cover disk of the character set forth herein which is simple in construction, economical to manufacture, and highly durable.

Another object of the invention is the provision of a wheel cover disk which may be made in a simple and efficient manner.

A further object of the invention is the provision of a composite wheel cover disk made from initially two separate parts which are joined together in a novel manner.

It is also a feature of the invention to provide a wheel cover disk in which a disk proper is provided with an ornamental and decorative element substantially permanently attached to the disk proper by an extremely simple and novel connection.

Another feature of the invention resides in the provision of a composite wheel cover disk in which the disk proper may be made of a rather economical metal, and the portion of this disk proper most subject to injury may be covered by a protective and decorative element of comparatively more expensive metal by a new and novel connection.

In accordance with the general features of this invention, there is provided an annular disk having an inwardly turned annular flange for snap-on engagement with disk retaining means usually carried by the vehicle wheel. The disk is provided with a central crown portion defined by an annular groove formation of the re-entrant type. A cover element is disposed over the central crown portion, and this cover element is provided with a depending flange or skirt which extends into the aforesaid groove formation. The groove formation together with the skirt of the crown element is bent inwardly in an undercut manner to firmly lock the crown element in position over the crown portion of the disk.

Other objects and features of this invention will more fully appear from the following detailed description taken in conjunction with the accompanying drawing, which illustrates a single embodiment of the invention, and in which.

As shown on the drawing.

The illustrated embodiment of the present invention is shown associated with a vehicle wheel 5 of the type of an automobile wheel equipped with the usual drop-center tire rim 6. The wheel cover disk structure is designed to overlie the outer side surface of the wheel 5, and the outer periphery of the disk is preferably associated with an outer portion of the wheel inside the outer peripheral edge of the tire rim 6.

Figure 1:
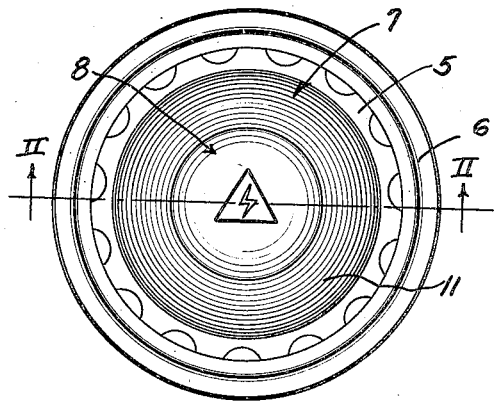
Figure 1 is a front elevational view of a vehicle wheel equipped with a wheel cover disk embodying principles of the present invention.
Figure 2:
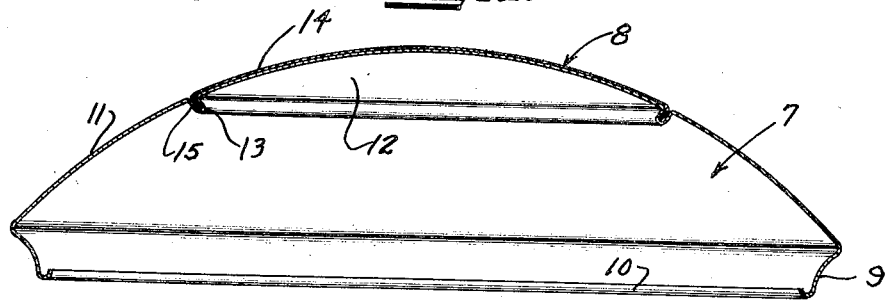
Figure 2 is a bottom plan sectional view through the disk structure itself separate from the wheel, taken substantially as indicated by the line II—II of Figure 1, looking in the direction of the arrows.

The disk structure includes a disk proper generally indicated by numeral 7 and a combined protective and decorative crown element generally indicated by numeral 8 associated with the central part of the disk proper. The disk proper 7 is preferably formed from a single piece of stock which may be a comparatively economical steel. The disk proper includes an inwardly turned circumferential flange 9 having a turned inner edge 10 for engagement with the spring retaining elements or equivalent means associated with the vehicle wheel to hold the disk in position over the outer side surface of the wheel. The disk is usually applied to the wheel by pressing the same axially into position upon the wheel, the retaining means snapping over the turned edge 10. The flange 9 is preferably of less diameter than the outermost circumferential edge of the disk so that the flange with its turned edge 10 is effectively concealed from view when the disk is in position upon a wheel. The disk proper also includes an outer circumferential portion 11 and a central crown portion 12 defined by an integral re-entrant groove formation 13 which, during the formation of the wheel cover disk structure as a whole, is initially in the form seen in Figure 3, with both sides of the groove extending substantially axially inwardly, and subsequently, in the form seen in Figures 2 and 4, with the sides of the groove extending obliquely inwardly in undercut fashion.

The combination protective and decorative crown element 8 overlies the crown part 12 of the disk proper and is connected to the disk by a method described and claimed in my copending application for Letters Patent entitled "Method of forming a wheel cover", filed of even date herewith, Serial No. 156,871.

The crown portion 8 includes a dome-shaped part 14 and a depending skirt or flange portion 15. It is preferably made of thinner material than the disk proper, and also preferably of a high grade form of steel, such as stainless steel. Being disposed over the crown portion of the disk, which is the part of the disk structure overlying the hub of the wheel and thus more susceptible to injury, such as bumps, abrasions and the like, than any other part, it affords protection for the disk proper. In such a location, the disk proper would be likely to be injured sufficiently to develop rusting and other forms of deterioration. That is effectively prevented by the provision of the crown element 8. Further, the crown element 8 may be left with a highly polished finish, while the outer circumferential portion 11 of the disk proper may be painted, enameled, or otherwise given a color in keeping with the other appointments of the vehicle but in contrast with the crown element 8, so that a very desirable color combination may thus be provided. It will, of course, be understood that the crown element 8 may be given substantially any color, if so desired.

Figure 3:
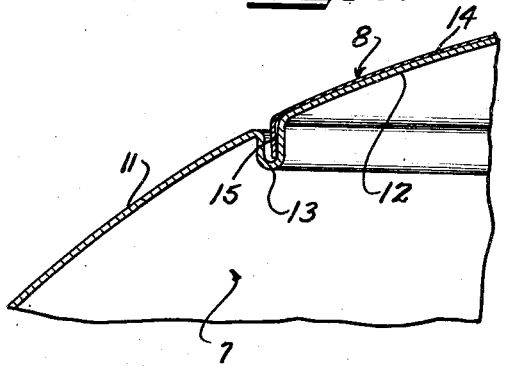
Figure 3 is an enlarged fragmentary sectional view, of the same location as Figure 2, but illustrating the parts prior to completion of the joining operation.
Figure 4:
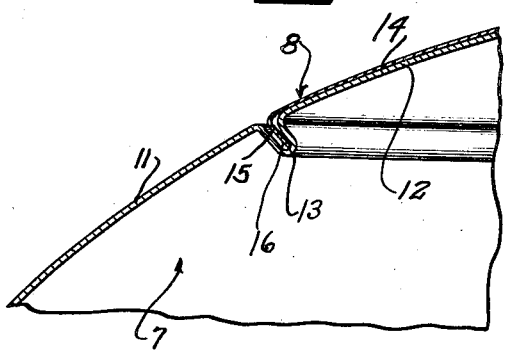
Figure 4 is a fragmentary enlargement of a portion of Figure 2.

In order to better understand my novel connection between the crown element and the disk proper, I have illustrated in Figure 3 the disposition of these parts prior to the completion of the connecting operation. In this figure, it will be seen that the parts may be positioned together with the flange 15 extending substantially the full depth of the groove formation 13. In this position, the flange 15 is closer to the radially innermost wall of the re-entrant groove. With the parts positioned as just above explained, by a simple operation as more fully set forth in my aforesaid copending application, the entire groove formation is kicked radially inwardly so as to present an undercut groove formation, and likewise the skirt 15 is bent inwardly, as indicated at 16 in Figure 4, so that the edge of this skirt is in biting engagement with an undercut portion of the most radially inner wall of the groove formation, thus locking the two parts firmly together.

It will be noted that the construction of the wheel cover disk as above described is extremely simple and economical to perform, and the resultant construction is highly durable and pleasing in appearance.

I desire it understood that, while I have illustrated and described in detail a preferred form of my invention, the invention is not to be thus limited, but only insofar as defined by the scope and spirit of the appended claims.

I claim as my invention:

1. In a wheel cover structure, a wheel cover member having a narrow mouthed re-entrant groove therein extending obliquely rearwardly and inwardly, and another member overlying a part of said cover member and having an obliquely rearwardly and inwardly inclined skirt seated in said groove to effectively unite said members.

2. In a wheel cover structure, a wheel cover member having an area enclosed by a groove, the distance around at the bottom of the groove being less than the distance around at the mouth thereof, and a sheet metal member having a central portion covering said area and a conical peripheral flange at an angle to said central portion and extending into said groove, the surfaces of the central portion of said sheet metal member and of the portion of said wheel cover member outside of said groove forming smooth continuations of each other.

3. In a wheel cover structure, a large sheet metal cover member having a portion forming a deep circular groove with a narrow mouth in the shape of a ring, a small sheet metal member covering the portion of said large sheet metal member encircled by said groove portion and having a flange at an angle to the central portion of said small sheet metal member and fitting in said groove, the surface of the central portion of said small sheet metal member forming a smooth continuation of the surface of the portion of said large sheet metal member outside of said groove portion and the diameter of the bottom of said groove and the edge of said flange being substantially different from the diameter of the mouth of said groove.

4. In a wheel cover structure, a wheel cover member having an area encircled by a groove, and another member having a central portion overlying said area and having a conical flange at an angle to said central portion and extending down into said groove to unite said members.

GEORGE ALBERT LYON.